(12) United States Patent
Takai

(10) Patent No.: US 11,264,820 B2
(45) Date of Patent: Mar. 1, 2022

(54) CHARGE MANAGEMENT APPARATUS, CHARGE MANAGEMENT SYSTEM, CHARGE MANAGEMENT METHOD

(71) Applicant: Toyota Jidosha Kabushiki Kaisha, Toyota (JP)

(72) Inventor: Tomohisa Takai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/544,086

(22) Filed: Aug. 19, 2019

(65) Prior Publication Data
US 2020/0076012 A1    Mar. 5, 2020

(30) Foreign Application Priority Data
Aug. 29, 2018  (JP) .............................. JP2018-160122

(51) Int. Cl.
| H02J 7/00 | (2006.01) |
| H01M 10/46 | (2006.01) |
| H01M 10/48 | (2006.01) |
| H01M 10/42 | (2006.01) |

(52) U.S. Cl.
CPC ......... *H02J 7/007* (2013.01); *H01M 10/4207* (2013.01); *H01M 10/4257* (2013.01); *H01M 10/46* (2013.01); *H01M 10/482* (2013.01); *H01M 10/486* (2013.01)

(58) Field of Classification Search
CPC ...................................................... H02J 7/007

USPC ........................................................ 320/107
See application file for complete search history.

(56) References Cited

U.S. PATENT DOCUMENTS

| 2005/0113972 | A1* | 5/2005 | Kumhyr .................. B60L 53/65 700/245 |
| 2008/0109114 | A1 | 5/2008 | Orita et al. |
| 2010/0121511 | A1* | 5/2010 | Onnerud ................. B60L 58/15 701/22 |
| 2013/0314036 | A1* | 11/2013 | Nakagawa ............... H02J 50/90 320/108 |
| 2016/0129793 | A1* | 5/2016 | Cronie .................. B60L 11/182 320/109 |
| 2017/0043671 | A1* | 2/2017 | Campbell ............... B60L 53/80 |

FOREIGN PATENT DOCUMENTS

| JP | 2000-047728 A | 2/2000 |
| JP | 2001-147718 A | 5/2001 |
| JP | 2005-168085 A | 6/2005 |
| JP | 4460411 B2 | 5/2010 |
| JP | 2011-203595 A | 10/2011 |

* cited by examiner

*Primary Examiner* — Eric D Lee
(74) *Attorney, Agent, or Firm* — Dinsmore & Shohl LLP

(57) ABSTRACT

A facility server manages battery charge of a plurality of robots in an environment where a charging device is shared by the plurality of robots. A waiting information acquisition unit acquires waiting information related to whether there is a robot which cannot use the charging device and is waiting, because another robot is charging a battery using the charging device. A charge suspension control unit controls, when there is a robot which cannot use the charging device and is waiting, control the other robot to suspend charging a battery.

16 Claims, 13 Drawing Sheets

| ROBOT No. | CARE RECIPIENT p1 | p2 | p3 | p4 | p5 | p6 |
|---|---|---|---|---|---|---|
| 51 | @ | | | | | |
| 52 | | | @ | @ | | |
| 53 | | | | | @ | |
| 54 | | @ | | | | |
| 55 | | | | | | @ |

Fig. 8

| ROBOT No. | CARE RECIPIENT p1 | p2 | p3 | p4 | p5 | p6 |
|---|---|---|---|---|---|---|
| 51 | — | — | — | — | — | — |
| 52 |  |  | @ | @ |  |  |
| 53 |  |  |  |  | @ |  |
| 54 |  | @ |  |  |  |  |
| 55 | @ |  |  |  |  | @ |

Fig. 9

| ROBOT No. | CARE RECIPIENT p1 | p2 | p3 | p4 | p5 | p6 |
|---|---|---|---|---|---|---|
| 51 | — | — | — | — | — | — |
| 52 | — | — | — | — | — | — |
| 53 |  |  | @ |  | @ |  |
| 54 |  | @ |  | @ |  |  |
| 55 | @ |  |  |  |  | @ |

Fig. 10

| ROBOT No. | CARE RECIPIENT p1 | p2 | p3 | p4 | p5 | p6 |
|---|---|---|---|---|---|---|
| 51 | — | — | — | — | — | — |
| 52 | — | — | — | — | — | — |
| 53 | — | — | — | — | — | — |
| 54 | — | — | — | — | — | — |
| 55 | @ | @ | @ | @ | @ | @ |

| ROBOT No. | 51 | 52 | 53 |
|---|---|---|---|
| CHARGE COUNT ACCUMULATED VALUE | 179 | 619 | 159 |

| FACILITY A | | | |
|---|---|---|---|
| ROBOT No. | 51 | 52 | 53 |
| CHARGE COUNT PER DAY | 10 | 15 | 17 |
| CHARGE WAIT COUNT PER DAY | 3 | 4 | 5 |
| BATTERY REPLACEMENT COUNT PER YEAR | 4 | 4 | 5 |

| FACILITY B | | | |
|---|---|---|---|
| ROBOT No. | 61 | 62 | 63 | 64 |
| CHARGE COUNT PER DAY | 3 | 2 | 5 | 3 |
| CHARGE WAIT COUNT PER DAY | 1 | 0 | 1 | 0 |
| BATTERY REPLACEMENT COUNT PER YEAR | 1 | 1 | 2 | 1 |

| FACILITY C | | |
|---|---|---|
| ROBOT No. | 71 | 72 |
| CHARGE COUNT PER DAY | 5 | 6 |
| CHARGE WAIT COUNT PER DAY | 0 | 0 |
| BATTERY REPLACEMENT COUNT PER YEAR | 2 | 2 |

Fig. 16

| FACILITY A | | | | |
|---|---|---|---|---|
| ROBOT No. | 51 | 52 | 53 | 54 |
| CHARGE COUNT PER DAY | 7 | 6 | 5 | 5 |
| CHARGE WAIT COUNT PER DAY | 3 | 4 | 5 | 0 |
| BATTERY REPLACEMENT COUNT PER YEAR | 4 | 4 | 5 | 1 |

| FACILITY B | | | |
|---|---|---|---|
| ROBOT No. | 61 | 62 | 63 |
| CHARGE COUNT PER DAY | 6 | 8 | 9 |
| CHARGE WAIT COUNT PER DAY | 1 | 0 | 1 |
| BATTERY REPLACEMENT COUNT PER YEAR | 1 | 1 | 2 |

| FACILITY C | | |
|---|---|---|
| ROBOT No. | 71 | 72 |
| CHARGE COUNT PER DAY | 4 | 5 |
| CHARGE WAIT COUNT PER DAY | 0 | 0 |
| BATTERY REPLACEMENT COUNT PER YEAR | 2 | 2 |

CHARGE MANAGEMENT APPARATUS, CHARGE MANAGEMENT SYSTEM, CHARGE MANAGEMENT METHOD

CROSS REFERENCE TO RELATED APPLICATIONS

This application is based upon and claims the benefit of priority from Japanese patent application No. 2018-160122, filed on Aug. 29, 2018, the disclosure of which is incorporated herein in its entirety by reference.

BACKGROUND

The present disclosure relates to a charge management device, a charge management system, and a charge management method.

Japanese Patent No. 4460411 discloses a robot control device that manages tasks to be executed by a robot including a movement function. More specifically, the robot control device judges whether a battery of a robot needs to be replenished while checking a remaining battery level of the robot as necessary, and when it does, reconfigures a plan to execute the tasks assigned to the respective robots while controlling the robot to replenish the battery. For example, tasks assigned to the robot judged that it requires battery replenishment are distributed to task schedules of the robots other than this robot.

SUMMARY

The present inventor has been examining a service environment in which a plurality of robots are arranged in one facility and they are made to share desired tasks. In this case, when charging devices more than or equal to the number of robots are disposed in the facility, the cost will become high, and the operation rate of the charging devices will become low. On the other hand, when the charging devices less than the number of the robots are disposed in the facility, the operation rate of the charging devices will become high. However, if a plurality of robots more than the number of the charging devices require the battery charging at the same time, there will be a queue of robots waiting for the battery charging, and there may be a robot running out of battery.

An object of the present disclosure is to provide a technique of effectively preventing a dead battery when a charging device is shared by a plurality of robots.

According to a first example aspect of the present disclosure, a charge management device manages battery charge of a plurality of robots in an environment where a charging device is shared by the plurality of robots. The charge management device includes: a waiting information acquisition unit configured to acquire waiting information related to whether there is a robot which cannot use the charging device and is waiting, because another robot is charging a battery using the charging device; and a charge suspension control unit configured to, when there is a robot which cannot use the charging device and is waiting, control the other robot to suspend charging a battery. According to the above method, it is possible to effectively prevent a dead battery when a charging device is shared by a plurality of robots.

In some embodiments, the charge suspension control unit controls the other robot to suspend charging the battery when a remaining battery level of the other robot reaches a predetermined remaining battery level. According to the above configuration, it is possible to more effectively prevent a dead battery.

In some embodiments, the charge suspension control unit controls the other robot to suspend charging the battery when the remaining battery level of the other robot reaches 50%. According to the above configuration, it is possible to more effectively prevent a dead battery.

In some embodiments, the charge suspension control unit controls the other robot to immediately suspend charging the battery or controls the other robot to suspend charging the battery after a predetermined time. According to the above configuration, it is possible to more effectively prevent a dead battery.

In some embodiments, the waiting information includes a wait possible time in which the robot which cannot use the charging device and is waiting can continue to wait without running out of a battery, and the charge suspension control unit controls the other robot to suspend charging the battery based on the wait possible time. According to the above configuration, it is possible to more effectively prevent a dead battery.

In some embodiments, the charge suspension control unit controls the other robot to suspend charging the battery before the wait possible time elapses. According to the above configuration, it is possible to surely prevent a dead battery.

In some embodiments, the plurality of robots are configured to provide electrical energy to each other, and the charge management device further includes a mutual charge control unit configured to control, when there is a robot which cannot use the charging device and is waiting, a first robot and a second robot in such a way that the first robot which now needs battery charging can receive the electrical energy from the second robot which has a sufficient remaining battery level. According to the above configuration, the battery charging can be started without making the first robot wait, thereby making it possible to more effectively prevent a dead battery. In some embodiments, the charge management device further includes a charge count accumulated value storage unit configured to store a charge count accumulated value of the battery of each robot, and a charge life management unit configured to determine necessity of battery replacement in each robot based on the charge count accumulated value. According to the above configuration, it is possible to more effectively prevent a dead battery.

In some embodiments, a charge management system includes: a plurality of the charge management devices disposed in a plurality of facilities; and a centralized management device connected to the plurality of charge management devices. The centralized management device includes: a replacement frequency storage unit configured to store a frequency of the battery replacement for each facility; and a supply frequency determination unit configured to determine a supply frequency of a replacement battery for each facility according to the frequency of the battery replacement. According to the above configuration, the supply frequency of the replacement battery can be determined as appropriate.

In some embodiments, a charge management system includes: a plurality of the charge management devices disposed in a plurality of facilities. The centralized management device includes: a charge frequency storage unit configured to store a frequency of the battery charge for each facility; and a relocation determination unit configured to determine relocation of the robot so as to reduce a difference in the frequencies of the battery charge among the facilities according to the frequency of the battery charge. According to the above configuration, an unevenness in the operation rates of the robots can be reduced among the plurality of facilities.

According to a second example aspect of the present disclosure, a charge management method for managing battery charge of a plurality of robots in an environment where a charging device is shared by the plurality of robots. The charge management method includes: acquiring waiting information related to whether there is a robot which cannot use the charging device and is waiting, because another robot is charging a battery using the charging device; and controlling, when there is a robot which cannot use the charging device and is waiting, the other robot to suspend charging a battery. According to the above method, it is possible to effectively prevent a dead battery when a charging device is shared by a plurality of robots.

According to the present disclosure, it is possible to effectively prevent a dead battery when a charging device is shared by a plurality of robots.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 is a watching task assignment table when a No. 51 robot is executing a charging task;
FIG. 9 is a watching task assignment table when No. 51 and No. 52 robots are executing a charging task;
FIG. 10 is a watching task assignment table when No. 51 to No. 54 robots are executing a charging task;
FIG. 14 is a charge count accumulated value of the facility server;
FIG. 15 is an operation rate management table of the centralized server before relocation;
and
FIG. 16 is an operation rate management table of the centralized server after relocation.

DESCRIPTION OF EMBODIMENTS

First Embodiment

Figure 1:
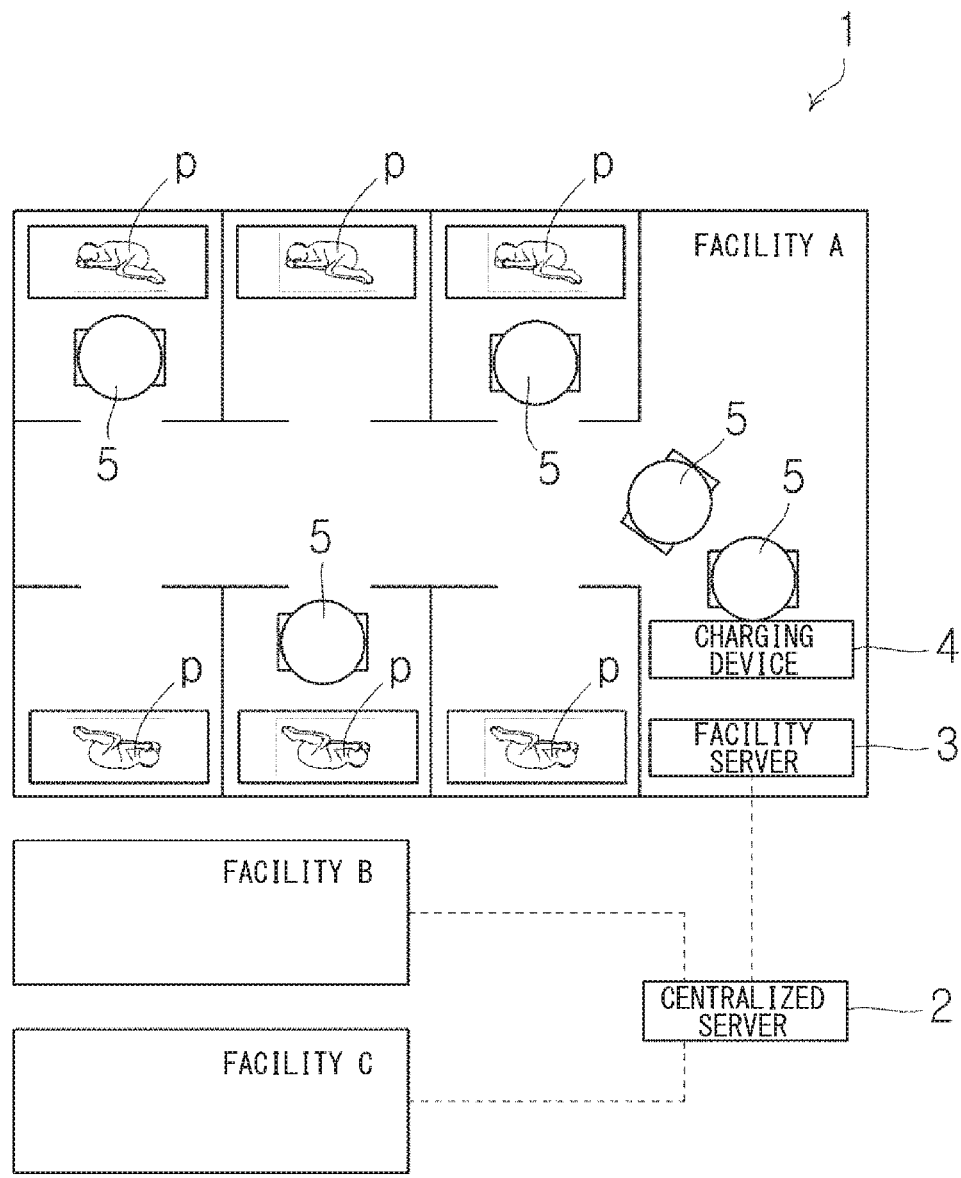
FIG. 1 is an overall schematic view of a service system.

Hereinafter, a first embodiment of the present disclosure will be described with reference to FIGS. 1 to 10.
(Service System 1)
As shown in FIG. 1, a plurality of care recipients p are accommodated in a facility A. Likewise, a plurality of care recipients (not shown) are accommodated in facilities B and C. The service system 1 shown in FIG. 1 provides predetermined nursing care services to the plurality of care recipients p accommodated in each facility. The service system 1 is an example of a charge management system. The nursing care service is one specific example of the service. The care recipient p is an example of an object to which the service is provided.

The service system 1 includes a centralized server 2, a plurality of facility servers 3, a plurality of charging devices 4, and a plurality of robots 5. The centralized server 2 is an example of a centralized management device. The facility server 3 is an example of a charge management device.

As shown in FIG. 1, one facility server 3, one charging device 4, and five robots 5 are disposed in the facility A. However, the number of the facility servers 3 disposed in the facility A is not limited to one, and instead may be two or more. Likewise, the number of charging devices 4 disposed in the facility A is not limited to one, and instead may be two or more. Likewise, the number of robots 5 disposed in the facility A is not limited to five, and instead may be one, two, three, four, or six or more.

In order to provide a nursing care service with a short waiting time, the more the robots 5 disposed in the facility A, the better it becomes, but this increases the cost. Likewise, in order for the robot 5 to be able to charge the battery with the charging device 4 at any time without waiting, the more the charging devices 4 disposed in the facility A, the better it becomes. For example, when five charging devices 4 are disposed in the facility A, each robot 5 can be charged at any time without a waiting time. However, when the number of charging devices 4 disposed in the facility A is increased, the cost is increased. Thus, it is desirable that the plurality of robots 5 share the charging device 4. In this embodiment, in order to achieve the service system 1 at low cost, the number of charging devices 4 disposed in the facility A is one, which is smaller than the number of robots 5 disposed in the facility A. The same applies to the facilities B and C.

(Robot 5)

Figure 2:
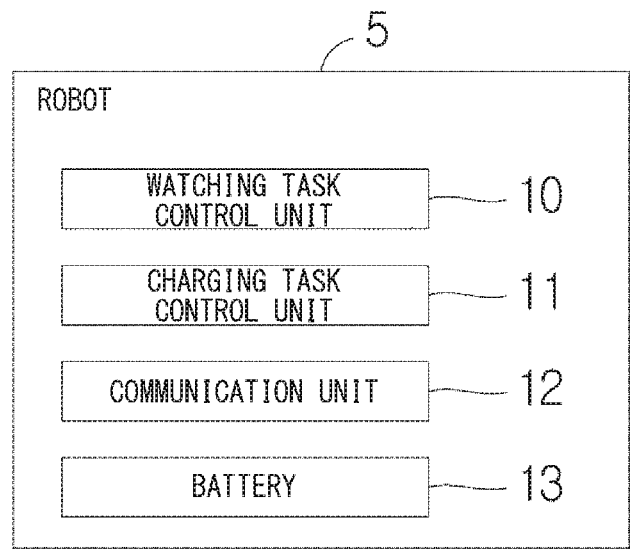
FIG. 2 is a functional block diagram of a robot.

In FIG. 2, the robot 5 includes a watching task control unit 10, a charging task control unit 11, a communication unit 12, and a battery 13. The robot 5 further includes a CPU, a RAM, and a ROM (not shown). Then, the CPU reads out a control program stored in the ROM and executes it, so that the control program causes hardware such as the CPU to function as the watching task control unit 10 or the charging task control unit 11. Note that the watching task control unit 10 and the charging task control unit 11 may be implemented by hardware.

Figures 6, 7:
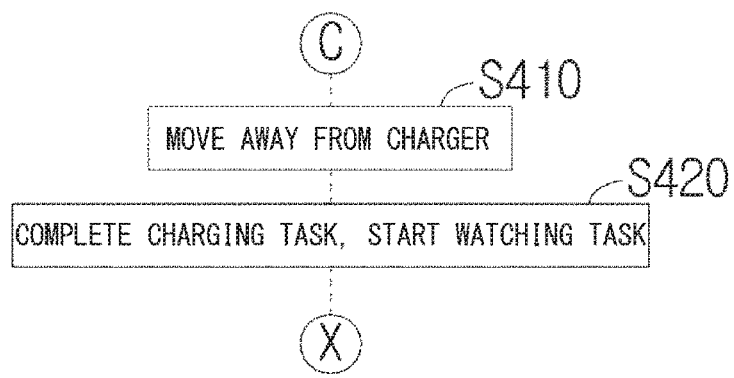
FIG. 6 is a time chart of control of the robot and the facility server.
FIG. 7 is a watching task assignment table.

The watching task control unit 10 controls the operation of the robot 5 when the robot 5 executes a watching task. Here, the watching task is one specific example of the service task. The watching task is an example of the main task. The watching task is, for example, a task of acquiring information about the care recipient p's health status assigned to the robot 5 itself from among the plurality of care recipients p in the facility A. As shown in FIGS. 7 to 10, the watching task control unit 10 also has a function of storing a watching task assignment table. For example, as shown in FIG. 7, the watching task assignment table is a table for identifying the care recipient p who provides the watching task for each robot 5.

The charging task control unit 11 controls the operation of the robot 5 when the robot 5 executes the charging task. Here, the charging task is a specific example of the subtask. In the charging task, for example, a remaining battery level of the battery 13 of the robot 5 is acquired, and when it is determined that the battery needs to be charged, the robot 5 is made to move to the charging device 4 in the facility A and execute a predetermined charging operation.

The communication unit 12 is in charge of radio communication with the facility server 3.

The battery 13 is chargeable and replaceable. The battery 13 has a property that the remaining battery level at full charge gradually decreases when it is repeatedly charged and discharged. It is thus desirable to replace the battery 13 with a replacement battery at an appropriate timing.

In this embodiment, each robot 5 is configured to be able to execute the charging task with another robot 5 by being physically connected to the other robot 5. In other words, the battery 13 of each robot 5 can be charged by being physically connected to another robot 5.

Further, the robot 5 stores map information and is configured to move freely within the facility A without colliding based on the map information. The robot 5 is configured to be able to recognize a person or a thing present around the robot 5 by including a stereo camera or a depth sensor mounted thereon, and to autonomously move while avoiding a collision with the person or the thing.

(Facility Server 3)

Figure 3:
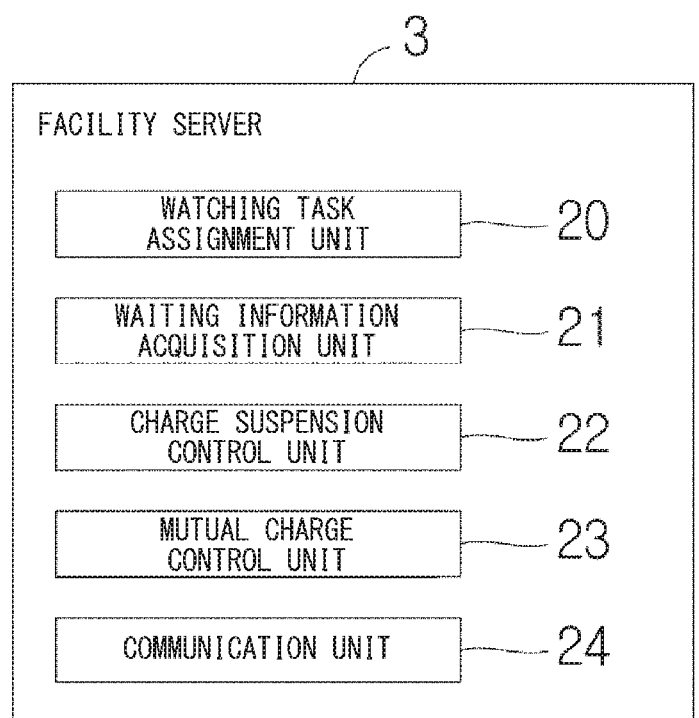
FIG. 3 is a functional block diagram of a facility server.

In FIG. 3, the facility server 3 includes a watching task assignment unit 20, a waiting information acquisition unit 21, a charge suspension control unit 22, a mutual charge control unit 23, and a communication unit 24. The facility server 3 further includes a CPU, a RAM, and a ROM (not shown). The CPU reads a control program stored in the ROM and executes the program, so that the control program causes hardware such as the CPU to function as the watching task assignment unit 20, the waiting information acquisition unit 21, the charge suspension control unit 22, and the mutual charge control unit 23. The watching task assignment unit 20, the waiting information acquisition unit 21, the charge suspension control unit 22, and the mutual charge control unit 23 may be implemented by hardware.

As shown in FIG. 7, the watching task assignment unit 20 assigns the watching tasks to the plurality of robots 5 disposed in the facility A as needed, and outputs a result of the assignment to the plurality of robots 5 which can execute the watching tasks. For example, when any of the robots 5 shifts from the watching task to the charging task, and when any of the robots 5 shifts from the charging task to the watching task, the watching task assignment unit 20 re-executes the above-mentioned assignment of the watching tasks. In other words, for example, when any of the robots 5 shifts from the watching task to the charging task, and when any of the robots shifts from the charging task to the watching task, the watching task assignment unit updates the watching task assignment table of FIG. 7.

When one charging device 4 is shared by the plurality of robots 5 as in the facility A, the waiting information acquisition unit 21 acquires waiting information. The waiting information is related to whether there is a robot 5 which cannot use the charging device 4 and is waiting, because another robot 5 is using the charging device 4 to charge the battery. In addition to the information related to whether there is a robot 5 in the waiting state, the waiting information includes an identification number of the robot 5 in a waiting state and a wait possible time in which the robot 5 in the waiting state can continuously wait in the vicinity of the charging device 4 without running out of the battery. The waiting information may further include a waiting elapsed time that elapses while the waiting state lasts.

When there is a robot 5 which cannot use the charging device 4 and is waiting, the charge suspension control unit 22 controls the robot 5 which is currently charging the battery using the charging device 4 to suspend charging the battery.

When there is a robot 5 which cannot use the charging device 4 and is waiting, and when there is another robot 5 which now needs battery charging, the mutual charge control unit 23 controls each robot 5 to receive electrical energy from a different robot 5 which has a sufficient remaining battery level.

The communication unit 24 is in charge of radio communication with the plurality of robots 5. Further, the communication unit 24 is in charge of communication with the centralized server 2 via WAN.

(Charging Device 4)

Returning to FIG. 1, the charging device 4 can make one robot 5 to charge the battery at a time. The charging device 4 cannot charge a plurality of robots 5 at a time.

(Time Chart)

Next, control on the plurality of robots 5 and the facility server 3 in the facility A will be described with reference to FIGS. 4 to 10.

Figure 4:
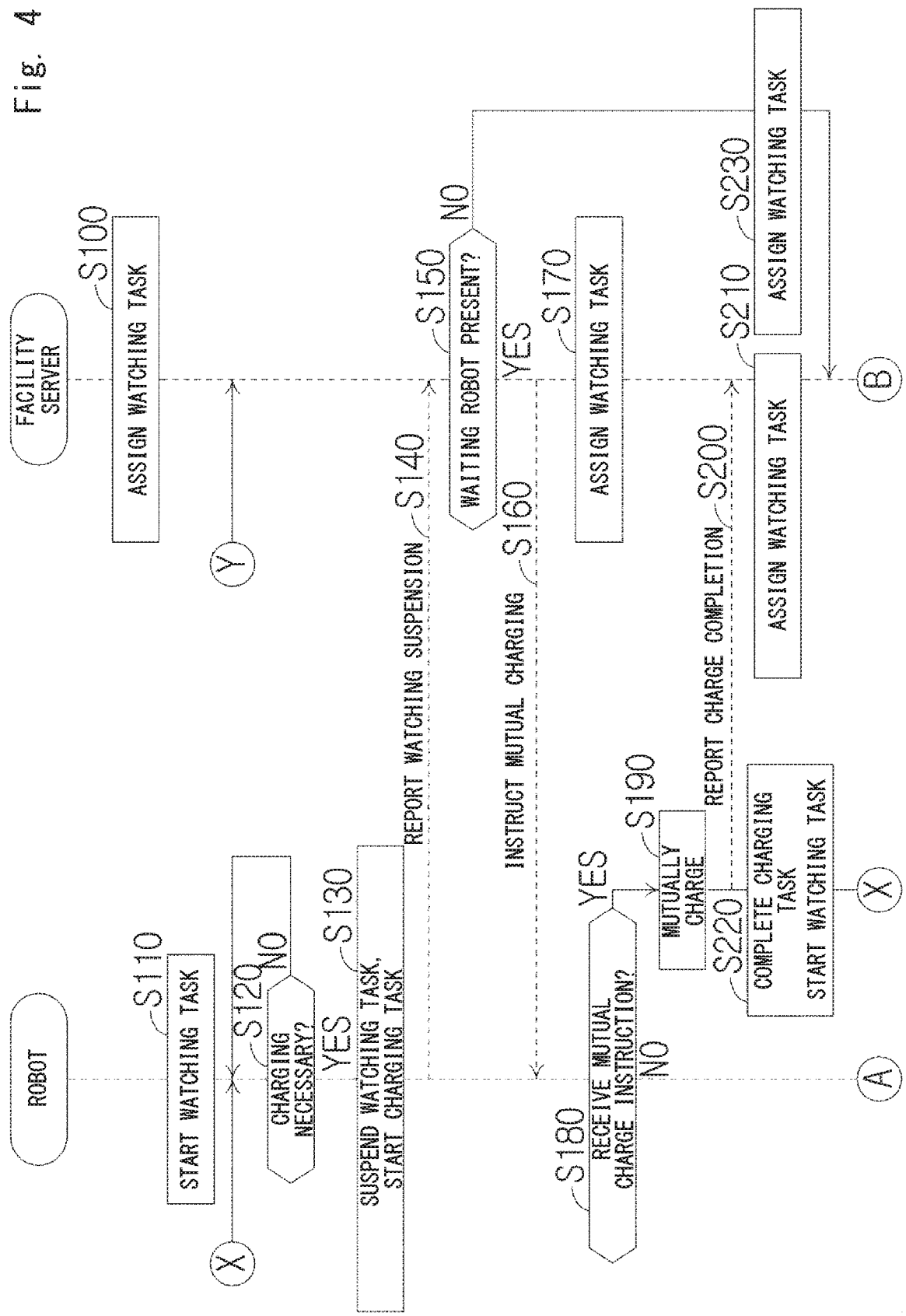
FIG. 4 is a time chart of control of the robot and the facility server.

First, in FIG. 4, the watching task assignment unit 20 of the facility server 3 executes watching task assignment (S100). FIG. 7 shows a specific example of the watching task assignment table. In the watching task assignment table, the term "robot No." indicates a number for identifying the five robots 5. Hereinafter, the robot 5 with a robot No. 51 is referred to as a robot 51 for convenience of descriptions. Likewise, a robot No. 52, a robot No. 53, a robot No. 54, and a robot No. 55 of the robots 5 are referred to as a robot 52, a robot 53, a robot 54, and a robot 55, respectively. Further, the plurality of care recipients p accommodated in the facility A are individually referred to as a care recipient p1, a care recipient p2, a care recipient p3, a care recipient p4, a care recipient p5, and a care recipient p6. The at-mark indicates the care recipient p that each robot 5 is in charge of.

In the example of FIG. 7, all the robots 5 are in a state in which they can execute the watching task. The care recipient p1 is assigned to the robot 51 as a target person of the watching task. The robot 52 is assigned to the care recipient p3 and the care recipient p4. The care recipient p5 is assigned to the robot 53. The care recipient p2 is assigned to the robot 54. The care recipient p6 is assigned to the robot 55.

In the example of FIG. 8, since the robot 51 is executing the charging task, only the robots 52 to 55 are in a state in which they can execute the watching task. Then, the care recipients p3 and p4 are assigned to the robot 52. The care recipient p5 is assigned to the robot 53. The care recipient p2 is assigned to the robot 54. The care recipients p1 and p6 are assigned to the robot 55.

In the example of FIG. 9, since the robot 51 and the robot 52 are executing the charging task, only the robots 53 to 55 are in a state in which they can execute the watching task. The care recipients p3 and p5 are assigned to the robot 53. The care recipients p2 and p4 are assigned to the robot 54. The care recipients p1 and p6 are assigned to the robot 55.

In the example of FIG. 10, since the robots 51 to 54 are executing the charging task, only the robot 55 is in a state in which it can execute the watching task. All the care recipients p are assigned to the robot 55.

Returning to FIG. 4, the robot 5 starts the watching task on the care recipient p assigned to the robot 5 itself (S110).

Next, the watching task control unit 10 monitors the remaining battery level of the battery 13 while executing the watching task and determines whether the battery 13 needs to be charged (S120). When the watching task control unit 10 determines that there is no need to charge the battery 13 (S120: NO), the process of S120 is repeated. On the other hand, when the watching task control unit 10 determines that the battery 13 needs to be charged (S120: YES), the process proceeds to S130. Note that the above-described determination is performed by, for example, the process of the following (1) to (3).

(1) The robot 5 calculates a distance from a current position to the charging device 4 based on the map information.

(2) The robot 5 determines whether a distance that the robot 5 can travel with the current remaining battery level is greater than a distance obtained by adding a margin to the distance calculated in the above (1).

(3) When it is YES in the determination (2), the robot 5 determines that the battery 13 does not need to be charged. On the other hand, when it is NO in the determination (2), the robot 5 determines that the battery 13 needs to be charged.

When it is YES in S120, the watching task control unit 10 suspends the watching task being executed, and the charging task control unit 11 starts the charging task (S130), and reports that the watching task has been suspended to the facility server 3 (S140).

When the mutual charge control unit 23 of the facility server 3 receives a watching suspension report from the robot 5, it determines whether there is a robot 5 which needs battery charging but cannot use the charging device 4 and is waiting (S150). The fact that there is the robot 5 which needs battery charging but cannot use the charging device 4 and is waiting means that there are at least two robots 5 which are executing the charging task. When the mutual charge control unit 23 determines that it is YES in S150, the mutual charge control unit 23 of the facility server 3 and the charging task control unit 11 of the robot 5 execute the mutual charge mode (S160 to S220) in cooperation to each other. The mutual charge mode will be described later.

On the other hand, when the mutual charge control unit 23 determines that it is NO in S150, the watching task assignment unit 20 executes the watching task assignment (S230). Specifically, for example, as shown in FIG. 8, when the robot 51 starts the charging task, the watching task assignment unit 20 assigns the care recipient p1 that the robot 51 has been in charge of to another robot 5. In the example of FIG. 8, the watching task assignment unit 20 assigns the care recipient p1 that the robot 51 has been in charge of to the robot 55. As a result, the robot 55 is in charge of the care recipients p1 and p6.

Figure 5:
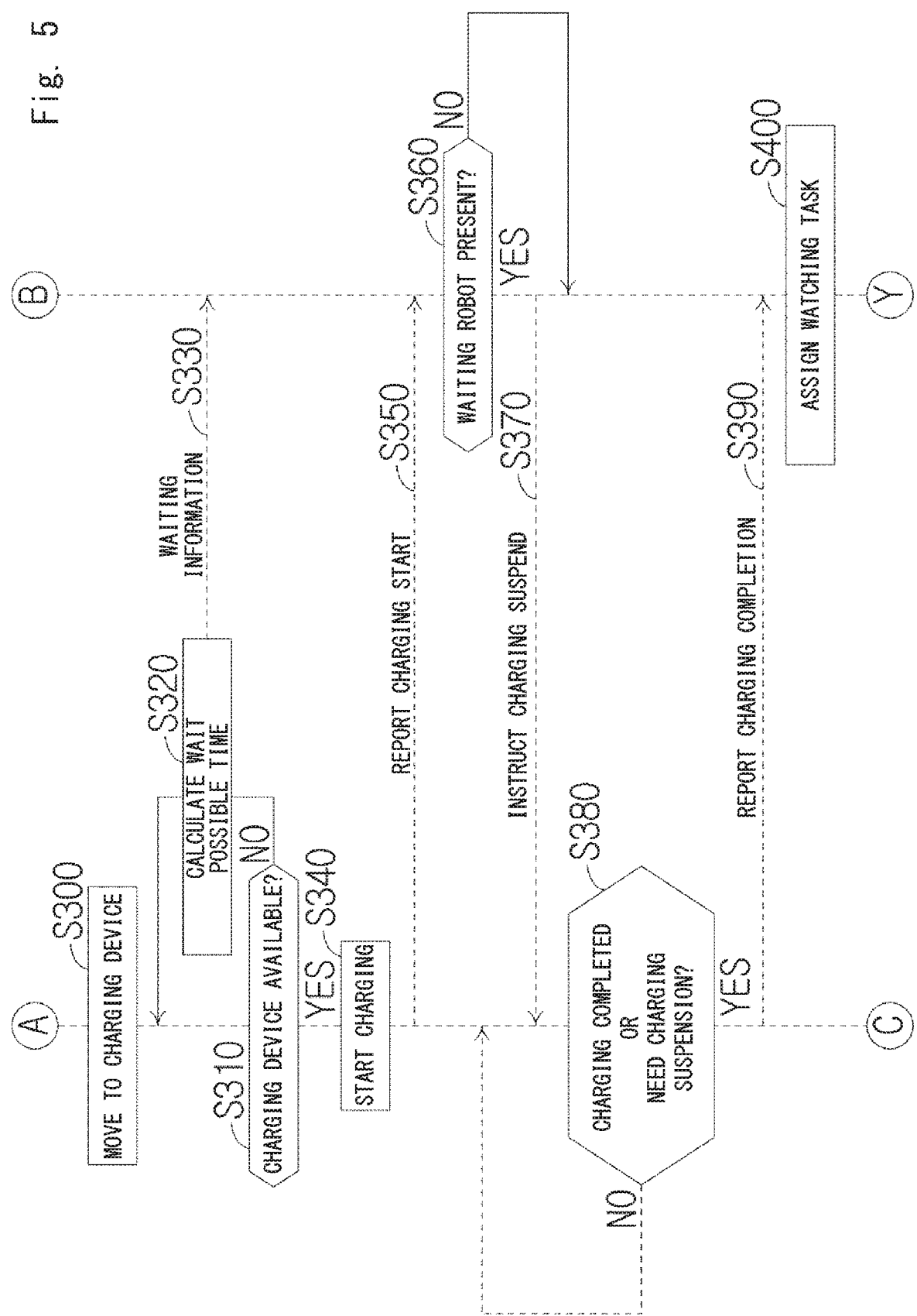
FIG. 5 is a time chart of control of the robot and the facility server.

As shown in FIG. 5, next, the charging task control unit 11 of the robot 5 executes movement control such that the robot 5 moves to the charging device 4 (S300). Specifically, the charging task control unit 11 calculates a movement route from the current position of the robot 5 itself to the charging device 4 and executes movement control such that the robot 5 travels along the calculated movement route.

When the robot 5 reaches the vicinity of the charging device 4, the charging task control unit 11 determines whether the charging device 4 is available (S310). Specifically, the charging task control unit 11 executes the above determination by determining whether there is another robot which is charging the battery using the charging device 4 based on a signal from the stereo camera or the depth sensor included in the robot 5. The charging task control unit 11 may autonomously execute the above determination using the stereo camera or the depth sensor, or may execute the above determination by making an inquiry to the facility server 3.

When the charging device 4 is not available (S310: NO), the charging task control unit 11 calculates the wait possible time (S320), transmits the waiting information to the waiting information acquisition unit 21 of the facility server 3 (S330), and repeats the process of S310. On the other hand, when the charging device 4 is available (S310: YES), the charging task control unit 11 starts battery charging using the charging device 4 (S340), and reports that the charging has started to the charge suspension control unit 22 of the facility server 3 (S350).

The charge suspension control unit 22 determines whether there is a robot 5 which cannot use the charging device 4 and is waiting based on the waiting information acquired in S330 (S360). When it is determined that there is a robot 5 which cannot use the charging device 4 and is waiting (S360: YES), the charge suspension control unit 22 transmits a charge suspension instruction to the robot 5 so that the robot 5 which is currently charging the battery using the charging device 4 suspends the battery charging (S370).

Here, the charge suspension instruction may instruct the robot 5 which is currently charging the battery using the charging device 4 to suspend charging the battery when the remaining battery level reaches a predetermined remaining battery level, such as 50%. Alternatively, the charge suspension instruction may instruct the robot 5 which is currently charging the battery using the charging device 4 to immediately suspend charging the battery or to suspend charging the battery after a predetermined time. Further alternatively, the charge suspension instruction may instruct the robot 5 which is currently charging the battery using the charging device 4 to suspend charging the battery before the wait possible time of another robot 5 elapses.

When it is determined that there is a robot 5 which cannot use the charging device 4 and is waiting (S360: YES), the charge suspension control unit 22, immediately, after a predetermined time, or within the wait possible time of the other robot 5, may transmit the charge suspension instruction for instructing the robot 5 which is currently charging the battery using the charging device 4 to immediately suspend charging the battery (S370). That is, the predetermined time or the wait possible time may be counted on the facility server 3 side, or may be counted on the robot 5 side.

Next, the charging task control unit 11 determines whether the battery charging has been completed or whether the battery charging has to be suspended based on the charge suspension instruction (S380). When it is NO in S380, the charging task control unit 11 continues the battery charging while monitoring whether there is the charge suspension instruction, and repeats the determination in S380. On the other hand, when it is YES in S380, the charging task control unit 11 reports that the charge has been completed to the watching task assignment unit 20 of the facility server 3 (S390). The watching task assignment unit 20 receives the charge completion report (S390), and then executes the watching task assignment (S400).

Then, as shown in FIG. 6, the charging task control unit 11 of the robot 5 executes movement control such that the robot 5 moves away from the charging device 4 (S410). Then, when the charging task control unit 11 ends the charging task, the watching task control unit 10 starts the watching task assigned to the robot 5 itself (S420).

Returning to FIG. 4, the mutual charge mode (S160-S220), a description of which has been skipped, will be described now.

The mutual charge control unit 23 of the facility server 3 which has received the watching suspension report from the robot 5 (S140) determines whether there is a robot 5 which cannot use the charging device 4 and is waiting (S150). FIG. 9 shows the watching task assignment table when the robot 52 cannot use the charging device 4 and is waiting, because the robot 51 is charging the battery using the charging device 4. Then, it is assumed that the robot 5 which now needs battery charging this time is the robot 53. Further, it is assumed that the robot 54 is located near the robot 53, and the robot 54 has a sufficient remaining battery level. In this case, when it is YES in S150, the mutual charge control unit 23 transmits a mutual charge instruction to the robot 53 (first robot) and the robot 54 (second robot) (S160). The mutual charge instruction in this case instructs the robot 53 and the robot 54 to charge the battery using the robot 54. Then, the watching task assignment unit 20 executes the watching task assignment (S170). That is, as shown in FIG. 10, all the care recipients p are assigned to the robot 55.

In response to the reception of the mutual charge instruction (S180: YES), the charging task control unit 11 of the robot 53 docks to the robot 54, and charges the battery using the battery 13 of the robot 54 (S190). When the battery charging is completed, the charging task control unit 11 reports that the charging has completed to the watching task assignment unit 20 of the facility server 3 (S200). The watching task assignment unit 20 receives the charging completion report (S200), and executes the watching task assignment (S210). Thus, the watching task assignment table returns to one shown in FIG. 9, and the care recipient p is assigned to the robot 53 and the robot 54. Then, the charging task control unit 11 of each of the robot 53 and the robot 54 completes the charging task, and the watching task control unit 10 of each of the robot 53 and the robot 54 starts the watching task (S220).

The first embodiment has been described so far. The above embodiment has the following features.

The facility server 3 (charge management device) manages battery charging of the plurality of robots 5 in an environment where the charging device 4 is shared by the plurality of robots 5. The facility server 3 includes the waiting information acquisition unit 21 and the charge suspension control unit 22. The waiting information acquisition unit 21 acquires the waiting information related to whether there is a robot 5 which cannot use the charging device 4 and is waiting, because another robot 5 is charging the battery using the charging device 4. When there is a robot 5 which cannot use the charging device 4 and is waiting, the charge suspension control unit 22 controls the other robot 5 to suspend charging the battery. The other robot 5 is, for example, the robot 51, and the robot 5 waiting is, for example, the robot 52. According to the above configuration, it is possible to effectively prevent a dead battery when the charging device 4 is shared by the plurality of robots 5.

The charge suspension control unit 22 controls the other robot 5 in such a way that the other robot 5 suspends charging the battery when the remaining battery level of the other robot 5 reaches a predetermined remaining battery level. According to the above configuration, it is possible to more effectively prevent a dead battery.

The charge suspension control unit 22 controls the other robot 5 to suspend charging the battery when the remaining battery level of the other robot reaches 50%. According to the above configuration, it is possible to more effectively prevent a dead battery.

The charge suspension control unit 22 controls the other robot 5 to immediately suspend charging the battery or to suspend charging the battery after a predetermined time. According to the above configuration, it is possible to more effectively prevent a dead battery.

The waiting information shown in FIG. 5 includes the wait possible time as a time in which the robot 5 which cannot use the charging device 4 and is waiting can continuously wait without running out of the battery. The charge suspension control unit 22 controls the other robot 5 to suspend charging the battery based on the wait possible time. Specifically, the charge suspension control unit 22 controls the other robot 5 to suspend charging the battery before the waiting time of the other robot 5 elapses. According to the above configuration, it is possible to more effectively prevent a dead battery.

Further, the plurality of robots 5 are configured to provide the electrical energy of the battery to each other. The charge management charging device 4 further includes the mutual charge control unit 23. When there is a robot 5 which cannot use the charging device 4 and is waiting, the mutual charge control unit 23 controls the robots 53 and 54 in such a way that the robot 53 (first robot) which now needs battery charging can receive the electrical energy from the robot 54 (second robot) which has a sufficient remaining battery level. According to the above configuration, the battery charging can be started without making the robot 53 wait, thereby making it possible to more effectively prevent a dead battery.

Further, the charge management method is a method of managing the battery charging of the plurality of robots 5 in an environment where the charging device 4 is shared by the plurality of robots 5. The charge management method includes a waiting information acquisition step (S330) and a charge suspension control step (S360-S370). In the waiting information acquisition step (S330), the waiting information is acquired. The waiting information is related to whether there is a robot 5 which cannot use the charging device 4 and is waiting, because another robot 5 is charging the battery using the charging device 4. In the charge suspension control step (S360-S370), when there is a robot 5 which cannot use the charging device 4 and is waiting, control is performed such that the other robot 5 suspends charging the battery. According to the above method, when the charging device 4 is shared by the plurality of robots 5, it is possible to effectively prevent a dead battery.

Second Embodiment

Next, a second embodiment of the present disclosure will be described with reference to FIGS. 11 to 16. The following descriptions will be focused on differences between the second embodiment and the first embodiment, and repeated descriptions will be omitted. Further, this embodiment can be implemented in combination with the first embodiment.

(Facility Server 3)

Figure 11:
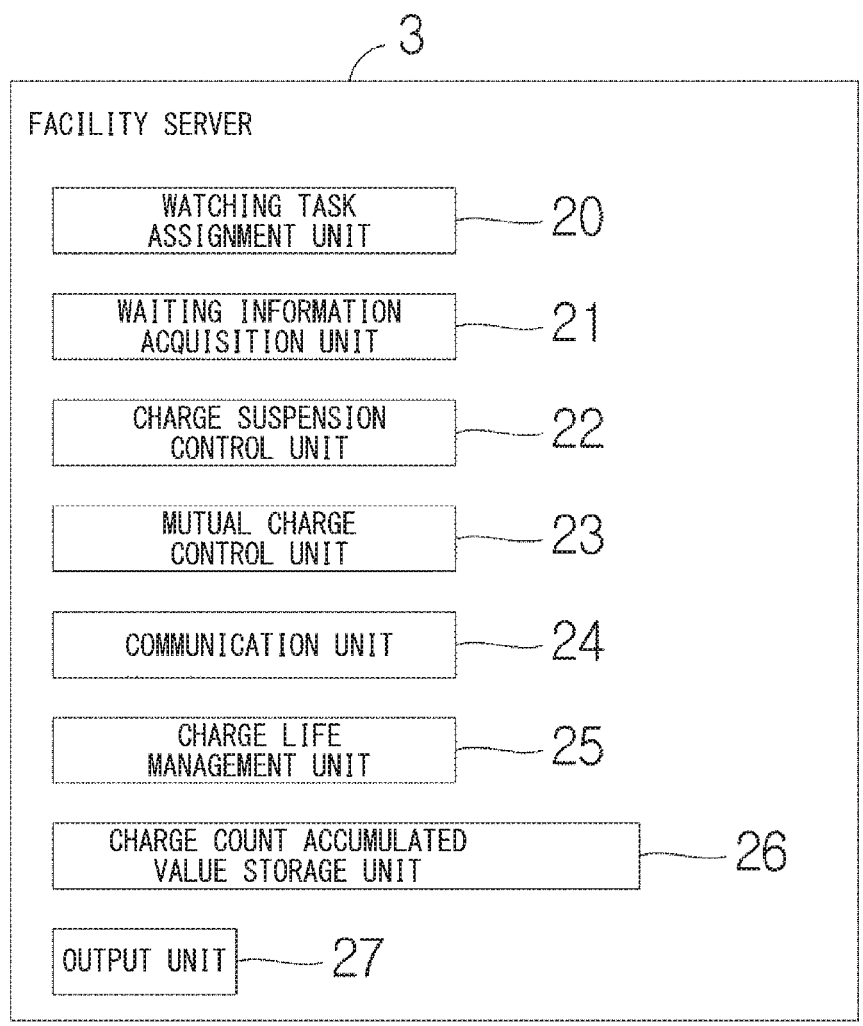
FIG. 11 is a functional block diagram of the facility server.

As shown in FIG. 11, in this embodiment, the facility server 3 further includes a charge life management unit 25, a charge count accumulated value storage unit 26, and an output unit 27. The charge life management unit 25 and the charge count accumulated value storage unit 26 may be implemented by software as described above or may be implemented by hardware.

As shown in FIG. 14, the charge count accumulated value storage unit 26 stores a charge count accumulated value table in which the identification number of the robot 5 is associated with an accumulated value of charge counts of the battery 13 currently mounted on the robot 5. In the example of FIG. 14, the accumulated value of the charge counts of the battery 13 of the robot 51 is 179. Likewise, the accumulated values of the robot 52 and the robot 53 are 619 and 159, respectively. The charge count of the battery 13 is synonymous with the number of cycles of charging and discharging of the battery 13.

The charge life management unit 25 manages the life of the battery 13 of each robot 5 by updating the charge count accumulated value table and referring to the charge count accumulated value table.

The output unit 27 is, for example, a liquid crystal display.

(Centralized Server 2)

Figure 12:
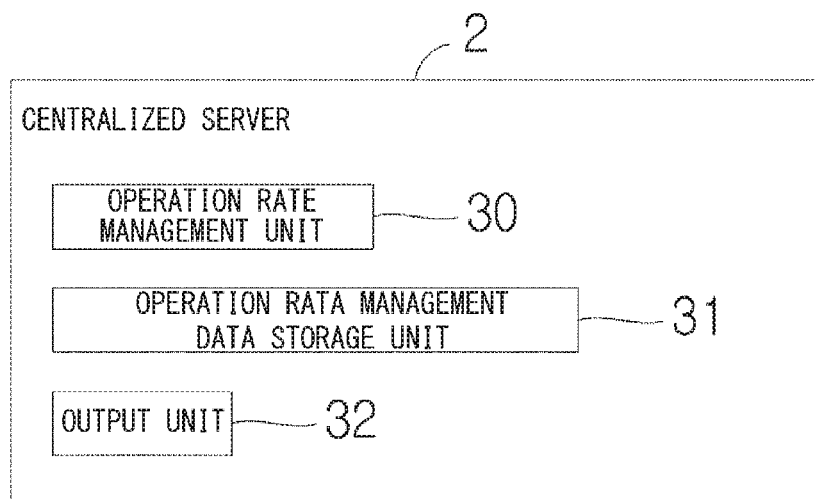
FIG. 12 is a functional block diagram of a centralized server.
Figure 13:
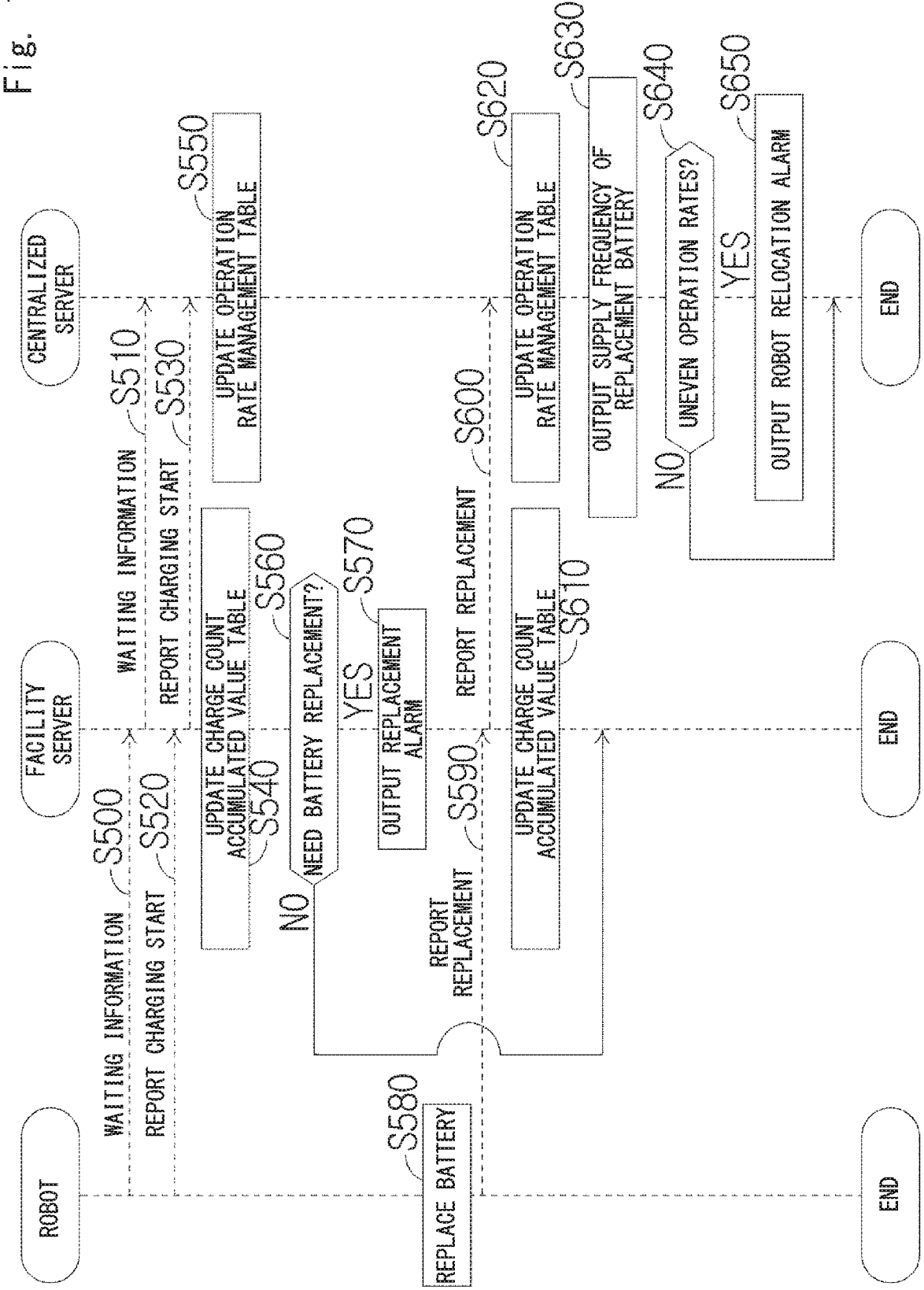
FIG. 13 is a time chart of control of the robot, the facility server, and the centralized server.

The centralized server 2 aggregates information from the facility server 3 of each facility, and manages the operation of each facility. As shown in FIG. 12, the centralized server 2 includes an operation rate management unit 30, an operation rate management data storage unit 31, and an output unit 32. The operation rate management unit 30 and the operation rate management data storage unit 31 may be implemented by software as described above or may be implemented by hardware.

The operation rate management data storage unit 31 stores an operation rate management table shown in FIG. 15. In the operation rate management table, for each facility, the identification number of the robot 5 is associated with the charge count of the battery 13 per day, the charge wait count per day, and a battery replacement count per year. In the example of FIG. 15, in the facility A, the charge count of the battery 13 of the robot 51 per day is 10, the charge wait count of the robot 51 per day is 3, and the battery replacement count of the robot 51 per year is 4. Likewise, in the facility A, the charge count of the battery 13 of the robot 52 per day is 15, the charge wait count of the robot 52 per day is 4, and the battery replacement battery of the robot 52 per year is 4. Likewise, in the facility A, the charge count of the battery 13 of the robot 53 per day is 17, the charge wait count of the robot 53 per day is 5, and the battery replacement count of the robot 53 per year is 5. In the facility B, a robot 61, a robot 62, a robot 63, and a robot 64 are disposed. In the facility C, a robot 71 and a robot 72 are disposed. The operation rate management tables in the facilities B and C are as shown in FIG. 15.

The operation rate management unit 30 manages the operation rate of the robot 5 in each facility by updating the operation rate management table and referring to the operation rate management table.

The output unit 32 is, for example, a liquid crystal display.

(Time Chart)

Next, control of the facility server 3 in each facility and control of the centralized server 2 will be described with reference to FIGS. 13 to 16.

First, as described in the first embodiment, when the waiting information is transmitted from the charging task control unit 11 of the robot 5 to the facility server 3 (S500), the facility server 3 transfers the waiting information to the centralized server 2 (S510). Further, when a charge start report is transmitted from the charging task control unit 11 of the robot 5 to the facility server 3 (S520), the charge life management unit 25 of the facility server 3 transfers the charge start report to the centralized server 2 (S530).

Next, the charge life management unit 25 of the facility server 3 refers to the charge start report, and increments the charge count accumulated value of the corresponding robot No. in the charge count accumulated value table shown in FIG. 14 (S540).

The operation rate management unit 30 of the centralized server 2 refers to the waiting information and the charge start report, and increments the charge count of the corresponding robot No. per day and the charge wait count of the corresponding robot No. per day in the operation rate management table shown in FIG. 15 (S550).

Next, the charge life management unit 25 refers to the charge count accumulated value table to determine whether the battery of any one of the robots 5 needs to be replaced (S560). Specifically, the charge life management unit 25 determines whether the charge count accumulated value in each robot 5 exceeds 500, and when it does, it determines that the battery of the corresponding robot 5 needs to be replaced. On the other hand, when the charge count accumulated value in each robot 5 does not exceed 500, the charge life management unit 25 determines that it is not necessary to replace the battery of the robot 5. In the example of FIG. 14, the charge life management unit 25 determines that the battery of the robot 52 needs to be replaced.

When it is YES in S560, the charge life management unit 25 outputs a replacement alarm through the output unit 27 indicating that the battery 13 of the robot 5 determined that the battery thereof needs to be replaced with a replacement battery (S570). Note that the replacement battery is a new battery.

In response to the replacement alarm, an operator of the facility A replaces the battery 13 of the robot 5 with the replacement battery (S580). Then, the charging task control unit 11 of the robot 5 reports that the battery 13 has been replaced to the facility server 3 (S590). The facility server 3 transfers the replacement report from the robot 5 to the centralized server 2 (S600).

Further, the charge life management unit 25 clears, to zero, the charge count accumulated value of the robot 5 whose battery 13 has been replaced (S610).

Further, the operation rate management unit 30 increments the battery replacement count per year of the robot 5 whose battery 13 has been replaced (S620).

When it is NO in S560, the charge life management unit 25 ends the process.

After that, the operation rate management unit 30 of the centralized server 2 calculates how often the battery should be replaced and how many of the replacement battery should be supplied to each facility based on a total battery replacement count per year of the robot 5 for each facility, and outputs a result of the calculation through the output unit 32 (S630).

Specifically, in the example of FIG. 15, the total battery replacement count of the three robots 5 disposed in the facility A per year is 13. Thus, the operation rate management unit 30 outputs a message indicating "Facility A: supply four new batteries every three months" through the output unit 32. The operator of the centralized server 2 makes an arrangement with a vendor to have the vendor deliver four new batteries every three months to the facility A based on the message.

Moreover, the total battery replacement count per year of the four robots 5 disposed in the facility B is 5. Thus, the operation rate management unit 30 outputs a message indicating "Facility B: supply five new batteries at the end of the year" through the output unit 32. The operator of the centralized server 2 makes an arrangement with the vendor to have the vendor deliver five new batteries at the end of the year to the facility B based on the message.

Further, the total battery replacement count of the two robots 5 disposed in the facility C per year is 4. Thus, the operation rate management unit 30 outputs a message indicating "Facility C: supply two new batteries every six months" through the output unit 32. The operator of the centralized server 2 makes an arrangement with the vendor to have the vendor deliver two new batteries every six months to the facility C based on the message.

Further, the operation rate management unit 30 refers to the operation rate management table to determine whether the operation rate of the robot 5 is uneven among the facilities (S640). Specifically, as shown in FIG. 15, an average value of the charge count of the three robots 5 disposed in the facility A per day is 14. On the other hand, an average value of the charge count of the four robots 5 disposed in the facility B per day is 3.25. Thus, the operation rate of the robots 5 disposed at the facility A is approximately four times as high as the operation rate of the robots 5 disposed at the facility B. When the operation rate of the robots 5 in one facility differs from that in another facility by two times or more, the operation rate management unit 30 determines that the operation rate of the robot 5 is uneven. When it is YES in S640, the operation rate management unit 30 outputs a robot relocation alarm including a destination facility and a source facility regarding the relocation of the robot 5 through the output unit 32 so as to reduce the unevenness in the operation rates of the robot 5 among the facilities (S650). In the example of FIG. 15, the operation rate management unit 30 outputs a message "Relocate one robot 5 from facility B to facility A" through the output unit 32. Then, as shown in FIG. 16, the unevenness of the operation rate of the robots 5 in the facility A and the operation rate of the robot 5 in the facility B is reduced.

Further the operation rate management unit 30 refers to the operation rate management table of FIG. 15 to determine whether the total charge wait count per day exceeds a predetermined value for each facility, and when it does, it may output an additional charging device installation alarm indicating an installation of an additional charging device 4 in the facility through the output unit 32. Then, the charge wait count per day in the facility is reduced, which enables services with less waiting time to be provided to all the care recipients p.

Furthermore, the watching task assignment unit 20 may execute the assignment of the watching tasks in consideration of the remaining battery level and battery life of each robot 5. Here, the battery life can be calculated based on the charge count accumulated value.

The second embodiment has been described above. The above-described embodiment has the following features.

The facility server 3 further includes the charge count accumulated value storage unit 26 that stores the charge count accumulated value of the battery of each robot 5 and the charge life management unit 25 that determines the necessity of the battery replacement in each robot 5 based on the charge count accumulated value. According to the above configuration, it is possible to appropriately determine the necessity of the battery replacement.

The service system 1 (charge management system) includes a plurality of facility servers 3 disposed in the respective plurality of facilities, and a centralized server 2 (centralized management device) connected to the respective plurality of facility servers 3. The centralized server 2 includes the operation rate management data storage unit 31 (replacement frequency storage unit) that stores the frequency of the battery replacement for each facility and the operation rate management unit 30 (supply frequency determination unit) that determines a supply frequency of the replacement battery for each facility. According to the above configuration, the supply frequency of the replacement battery can be determined as appropriate.

Furthermore, the centralized server 2 includes, for each facility, the operation rate management data storage unit 31 (charge frequency storage unit) that stores a frequency of the battery charge and the operation rate management unit 30 (relocation determination unit) that stores relocation of the robot 5 so as to reduce the unevenness in the frequencies of the battery charge among the facilities according to the frequency of the battery charge. According to the above configuration, the unevenness in the operation rates of the robots 5 can be reduced among the plurality of facilities.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A charge management device for managing battery charge of a plurality of robots in an environment where a charging device is shared by the plurality of robots, the charge management device comprising:
   a waiting information acquisition unit configured to acquire waiting information related to whether there is a robot which cannot use the charging device and is waiting, because another robot is charging a battery using the charging device, the waiting information includes a wait possible time in which the robot cannot use the charging device and is waiting can continue to wait before running out of a battery; and
   a charge suspension control unit configured to, when there is a robot which cannot use the charging device and is waiting, control the other robot to suspend charging the battery based on the wait possible time.

2. The charge management device according to claim 1, wherein
   the charge suspension control unit controls the other robot to suspend charging the battery when a remaining battery level of the other robot reaches a predetermined remaining battery level.

3. The charge management device according to claim 2, wherein the charge suspension control unit controls the other robot to suspend charging the battery when the remaining battery level of the other robot reaches 50%.

4. The charge management device according to claim 1, wherein
the charge suspension control unit controls the other robot to immediately suspend charging the battery or controls the other robot to suspend charging the battery after a predetermined time.

5. The charge management device according to claim 1, wherein
the charge suspension control unit controls the other robot to suspend charging the battery before the wait possible time elapses.

6. The charge management device according to claim 1, wherein
the plurality of robots are configured to provide electrical energy to each other, and
the charge management device further comprises a mutual charge control unit configured to control, when there is a robot which cannot use the charging device and is waiting, a first robot and a second robot in such a way that the first robot which now needs battery charging can receive the electrical energy from the second robot which has a sufficient remaining battery level.

7. The charge management device according to claim 1, further comprising:
a charge count accumulated value storage unit configured to store a charge count accumulated value of the battery of each robot, and
a charge life management unit configured to determine necessity of battery replacement in each robot based on the charge count accumulated value.

8. A charge management system comprising:
a plurality of the charge management devices according to claim 1 disposed in a plurality of facilities; and
a centralized management device connected to the plurality of charge management devices, wherein
the centralized management device comprises:
a replacement frequency storage unit configured to store a frequency of the battery replacement for each facility; and
a supply frequency determination unit configured to determine a supply frequency of a replacement battery for each facility according to the frequency of the battery replacement.

9. A charge management system comprising:
a plurality of the charge management devices according to claim 1 disposed in a plurality of facilities, wherein
the centralized management device comprises:
a charge frequency storage unit configured to store a frequency of the battery charge for each facility; and
a relocation determination unit configured to determine relocation of the robot so as to reduce a difference in the frequencies of the battery charge among the facilities according to the frequency of the battery charge.

10. A charge management method for managing battery charge of a plurality of robots in an environment where a charging device is shared by the plurality of robots, the charge management method comprising:
acquiring waiting information related to whether there is a robot which cannot use the charging device and is waiting, because another robot is charging a battery using the charging device, the waiting information includes a wait possible time in which the robot cannot use the charging device and is waiting can continue to wait before running out of a battery; and
controlling, when there is a robot which cannot use the charging device and is waiting, the other robot to suspend charging the battery based on the wait possible time.

11. The charge management method according to claim 10, further comprising:
controlling the other robot to suspend charging the battery when a remaining battery level of the other robot reaches a predetermined remaining battery level.

12. The charge management method according to claim 10, further comprising:
controlling the other robot to suspend charging the battery when the remaining battery level of the other robot reaches 50%.

13. The charge management method according to claim 10, further comprising:
controlling the other robot to immediately suspend charging the battery or controlling the other robot to suspend charging the battery after a predetermined time.

14. The charge management method according to claim 10, further comprising:
controlling the other robot to suspend charging the battery before the wait possible time elapses.

15. The charge management method according to claim 10, wherein the plurality of robots are configured to provide electrical energy to each other, and
further comprising controlling, when there is a robot which cannot use the charging device and is waiting, a first robot and a second robot in such a way that the first robot which now needs battery charging can receive the electrical energy from the second robot which has a sufficient remaining battery level.

16. The charge management method according to claim 10, further comprising:
storing a charge count accumulated value of the battery of each robot, and
determining a necessity of battery replacement in each robot based on the charge count accumulated value.

* * * * *